(No Model.)

C. S. GIGER.
Harrow.

No. 238,675. Patented March 8, 1881.

WITNESSES:
A. Schehl.
C. Sedgwick

INVENTOR:
C. S. Giger
BY Munn & Co
ATTORNEYS.

UNITED STATES PATENT OFFICE.

CHARLES S. GIGER, OF HIGHLAND, ASSIGNOR TO HIMSELF AND JOHN F. SOMMERFELDT, OF OLD RIPLEY, ILLINOIS.

HARROW.

SPECIFICATION forming part of Letters Patent No. 238,675, dated March 8, 1881.

Application filed April 26, 1880. (No model.)

*To all whom it may concern:*

Be it known that I, CHARLES SHEPARD GIGER, of Highland, in the county of Madison and State of Illinois, have invented a new and useful Improvement in Harrows, of which the following is a specification.

Figure 1:
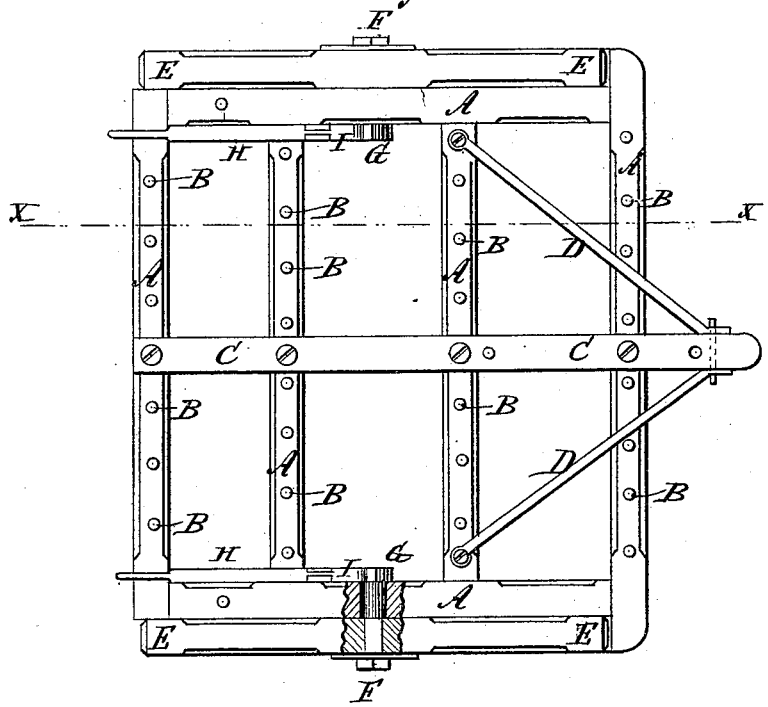
Figure 2:
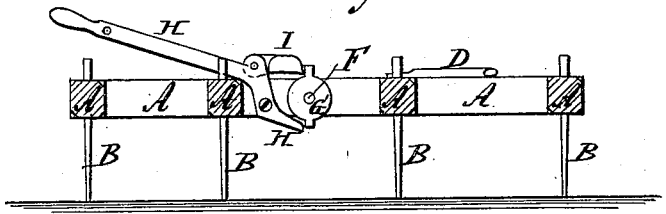

Figure 1 is a plan view of the improvement. Fig. 2 is a sectional side elevation taken through the line $x\ x$, Fig. 1.

The object of this invention is to furnish harrows so constructed that either side or the whole harrow can be readily raised from the ground to clear the harrow-teeth of trash.

The invention consists in the combination, with the side bars of a harrow-frame, of revolving side bars, pivoting-bolts, two-teethed wheels, levers, and pawls, whereby the harrow-frame may be raised to clear the harrow-teeth of trash, and in so constructing the harrow-frame that the ends of the front cross-bar, projecting to cover the ends of the revolving side bars, will protect the said ends from trash, as will be hereinafter fully described.

Similar letters of reference indicate corresponding parts.

A represents the harrow-frame to which the teeth B are attached, and which consists of four (more or less) cross-bars connected at their ends by side bars.

C is the draft-bar, which is attached to the centers of the cross-bars of the harrow-frame A, with its forward end projecting a little in front of the forward cross-bar of the said frame A. The forward part of the draft-bar C is strengthened against side strain by the inclined braces D, the forward ends of which are attached to the opposite sides of the forward end of the said draft-bar C, and their rear ends are attached to the end parts of the second cross-bar of the frame A. The ends of the forward cross-bar of the frame A project beyond the side bars of the said frame, so as to cover and protect from trash the ends of the bars E, placed at the sides of the side bars of the frame A and attached at their centers to the bolts F. The bolts F pass through holes in the side bars of the frame A, and their inner ends are attached to wheels G, placed at the inner sides of the side bars of the frame A. The bolts F are rigidly attached to the side bars, E, and to the wheels G, so that the said side bars and wheels may move together, the bolts F turning freely in the side bars of the frame A. The holes through the side bars of the frame A may be provided with metallic bushings or bearings to prevent the said side bars from being worn by the said bolts. The wheels G have each two teeth formed upon their opposite sides in such positions as to be at the upper and lower sides of the said wheels G when the bars E are parallel with the side bars of the frame A.

H are two levers, the forward parts of which are bent downward and then forward, and which are pivoted at their lower angles to the lower parts of the side bars of the frame A.

To the upper angles of the levers H are pivoted pawls I. The pawls I and the forward part of the levers H are made of such a length as to rest against the teeth of the wheel G and hold the side bars, E, parallel with the side bars of the frame A. The rear ends of the levers H project into such a position that they may be reached and operated by the driver when walking in the rear of the harrow. With this construction, when the rear ends of the levers H are raised the pawls I will be pressed against the upper teeth of the wheels G, and will turn the said wheels, turning the forward ends of the side bars E against the ground, so that the advance of the harrow will turn the bars E through a half-revolution. The revolution of the bars E raises the harrow-frame from the ground, so that any rubbish caught upon the teeth B will drop off.

If desired, cords may be attached to the outer ends of the levers H, led forward, and attached to the hames or some other part of the harness, so that a boy riding one of the horses can pull one or both cords, and thus operate one or both levers H to raise either side of the harrow or the whole harrow, as required.

Having thus fully described my invention, I claim as new and desire to secure by Letters Patent—

In a harrow provided with projecting front bar, the combination, with the side bars, of the revolving bars E, extending to the projecting front bar, the bolt F, the wheels G, having teeth upon the opposite sides, the levers H, and the pawls I, substantially as described, whereby either side of the harrow may be separately raised from the ground.

CHARLES SHEPARD GIGER.

Witnesses:
MILTON M. SHARP,
A. G. SOMMERFELDT.